March 22, 1932.   J. A. ROBERTSHAW   1,850,727
TEMPERATURE RESPONSIVE DEVICE
Filed April 7, 1930
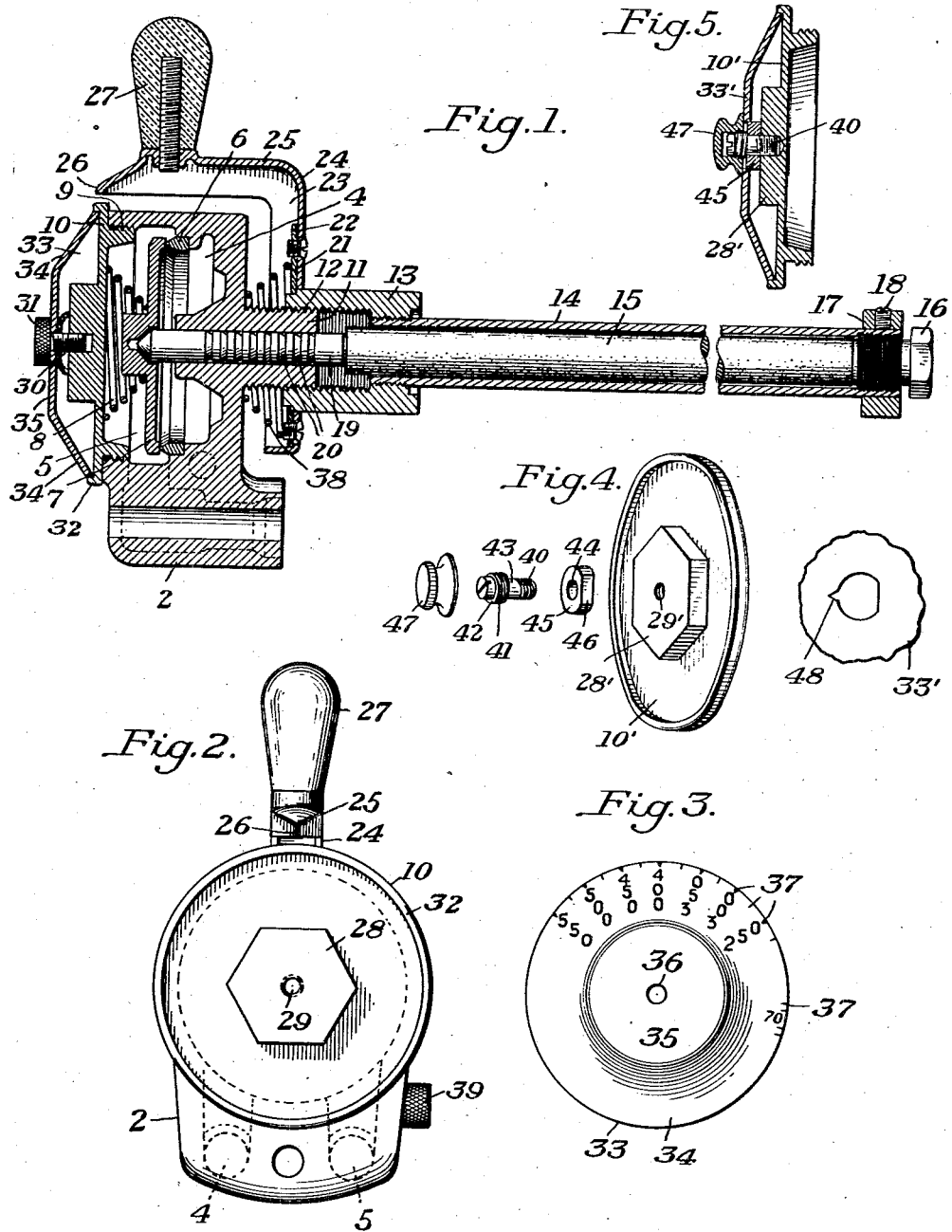
INVENTOR
John A. Robertshaw, Patented Mar. 22, 1932

1,850,727

UNITED STATES PATENT OFFICE

JOHN A. ROBERTSHAW, OF YOUNGWOOD, PENNSYLVANIA, ASSIGNOR TO ROBERTSHAW THERMOSTAT COMPANY, OF YOUNGWOOD, PENNSYLVANIA, A CORPORATION OF PENNSYLVANIA

TEMPERATURE RESPONSIVE DEVICE

Application filed April 7, 1930. Serial No. 442,110.

The present invention relates broadly to the art of temperature responsive devices, and more particularly to devices of this character ordinarily referred to as thermostats or thermostatically operated valves.

At the present time it is customary in the art to which the present invention relates to construct thermostats which are known as "rights" and "lefts", these words, respectively, having reference to whether the thermostats are to be viewed from the right side or the left side by the operator. A common example of a condition in which such valves are utilized is found in the ordinary domestic range in which the characteristics of the valve must be changed in accordance with whether a right hand oven or a left hand oven is provided.

Such a condition has necessitated manufacturers and dealers carrying both types in stock, and has further required the manufacturer to maintain the necessary extra equipment required by the two types of valves.

Such constructions have also involved a further objection from the standpoint of the user, in that the space available for a scale or other indicating means by which the user may adjust the temperature conditions to which the thermostat is responsive, has necessarily been limited to a space not exceeding, and usually considerably less than half of the periphery of the valve casing. This has necessarily somewhat restricted the range through which the thermostat could be conveniently adjusted.

In accordance with the present invention there is provided what may be termed a universal thermostat, in that a given construction is available for either a right or left hand oven, for example, or for any other condition normally encountered in the art requiring the use of such devices. This not only makes it possible for the manufacturer and dealer to satisfy all normal requirements by the same thermostat, but gives added room for the scale or other indicating means, thereby making it possible to indicate a greater range of temperatures. This in turn makes the thermostat more desirable from the standpoint of the user, inasmuch as a given thermostat may be manually set for a wider range of different temperature conditions.

The present invention further provides a construction which is desirable from the standpoint of appearance, compactness, ease of calibration, and relatively short over-all length.

In the accompanying drawings, I have shown for purposes of illustration only, a preferred embodiment of the invention.

In the drawings:

Figure 1 is a longitudinal sectional view through a thermostat constructed in accordance with the present invention, Figure 2 is an end elevation of a thermostat such as illustrated in Figure 1, the indicating dial, however, being removed therefrom, Figure 3 is an elevational view of the dial itself, Figure 4 is an exploded view of a portion of a slightly modified embodiment of the invention, and Figure 5 is a partial sectional view showing the parts of Figure 4 in assembled relationship.

In carrying out the present invention, there may be provided a housing or casing 2 adapted to contain the means which it is desired to operate in accordance with certain temperature conditions. This casing is herein illustrated as of such construction as to be adaptable for the controlling of a combustible fluid, such as gas. To this end it is provided with inlet and outlet openings 4 and 5, respectively, between which is formed a seat 6. Cooperating with this seat is a valve 7 which is preferably urged in one direction by a spring 8.

The interior of the casing is threaded as indicated at 9 to receive a cap 10 by means of which the casing is closed against the escape of the combustible fluid.

Extending rearwardly of the casing is a projection 11 preferably provided on its exterior surface with a thread 12 of relatively steep pitch, whereby a comparatively small rotational movement of a part in engagement therewith will produce a relatively large axial movement of such part toward or from the casing.

Cooperating with the thread 12 is an internally threaded bushing 13 to which is suitably connected a tube 14 of relatively expansible material. This tube provides a housing for a rod 15 of relatively non-expansible material, such as carbon, this construction being well understood in the art. Cooperating with the outer end of the tube 14 is a screw threaded plug 16 which may be threaded more or less into the tube for providing the initial setting for the parts.

This setting having been determined, accidental movement thereof may be prevented by providing the tube with a ring 17 carrying a set screw 18. By reason of this construction it is possible, by tightening the set screw, to slightly deform the end of the tube and thereby bind the plug 16 in its adjusted position.

For transmitting pressure from the rod 15 to the valve for operating the valve in accordance with temperature changes, there is provided a pressure transmitting and sealing pin 19. This pin, as well understood in the art, preferably has a close sliding fit with the opening provided therefor in the casing 2, and is provided with grooves 20 within which oil or other sealing material may be retained. This prevents the leakage of combustible fluid from the casing 2 into the space between the rod 15 and the tube 14.

Suitably secured to the bushing 13 is a flange 21 herein illustrated as being of substantially circular contour with the exception of a projection 22 at one point on its periphery. This flange is adapted to be received within a recess 23 in an adjusting lever or handle 24, which handle has one portion extending around the bushing and embracing the flange 21, and another portion 25 extending over the casing 2 and terminating in a pointer 26. It is this portion 25 which is preferably provided with an operating handle 27 by means of which the operator may effect rotation of the bushing 13 and its associated parts on the threaded projection 11.

By reference more particularly to Figure 2 of the drawings it will be noted that the cap 10 is formed with a central angular portion 28 of such shape as to receive a wrench or other tool for setting or removing the cap. Centrally within the cap is a threaded opening 29 adapted for the reception of a screw 30, which screw is provided on its outer end with a knurled finger engaging portion 31.

The cap 10 is also formed with a peripheral flange 32, which flange is of such dimensions to substantially conform to the outer periphery of a dial 33. This dial, as will be clearly apparent from Figures 1 and 3, is so shaped as to provide a tapered or inclined peripheral portion 34 with a substantially flat central portion 35. This central portion is provided with an opening 36 extending, when the dial is applied, in alinement with the opening 29, whereby the screw 30 may be passed therethrough and tightened in position for preventing accidental displacement of the dial.

With the dial in position, the cap 10 is substantially completely inclosed and the appearance of the assembly correspondingly improved. By merely loosening the screw 30, however, the dial is sufficiently loosened so that it is possible to rotate the dial relatively to the cap and thereby effect a close adjustment of the temperatures at which the device is operative. This is accomplished by providing the dial, preferably on its tapered portion 35, with graduations 37. Inasmuch as it is sometimes necessary to install the thermostat in such manner that one side of the dial will be visible, while in other cases it is so installed that the opposite side will be visible, I preferably form the temperature designations in the manner illustrated more particularly in Figure 3.

In this figure the numbers 550 to 400 run from the outer periphery of the dial toward the center thereof, while the numbers 350 to 70 run from the center of the dial toward the outer periphery. By reason of this construction, regardless of the side from which the dial is read, the numbers indicating temperatures appear in their natural sequence from the standpoint of the operator. This not only improves the appearance of the installation, but expedites its use.

Assuming a given setting of the plug 16, with a given position of the pointer 26, it will be apparent that if the dial 33 is rotated relatively to the pointer, it is possible to calibrate the device and thereby make the temperatures to which it is responsive exactly coincide with the temperature indicated by the relationship between the pointer and the dial.

The construction is further an advantageous one in that it is never possible to completely lose the factory setting of the thermostat for the reason that a complete rotation of the dial brings the parts back exactly to their original position. This is decidedly more desirable than constructions in which the adjustment is effected by rotating one of the operative parts of the thermostat, inasmuch as the operator sometimes loses count of the number of complete revolutions which have been made. In such case it is frequently necessary to return the thermostat to the factory for suitable adjustment.

In order to frictionally hold the pointer in adjusted position, I may provide a spring 38 between the casing 2 and the flange 21 so as to exert a frictional holding pressure on these parts.

The valve may, of course, be provided with any usual form of by-pass between the inlet and outlet, the adjustment for which is indicated at 39 in the drawings. This may be of any well known construction, and is therefore not referred to in detail.

The use of the knurled portion 31 on the screw 30 is desirable inasmuch as the tightening pressure which can be exerted by the fingers is necessarily limited and is not sufficient to crack or deform the dial. This is especially important where the dial is enameled as is customary in installations of this character.

In Figures 4 and 5 there is illustrated a slightly modified embodiment of the invention which, for many installations, is preferred to that illustrated, for example, in Figure 1 of the drawings. With the embodiment illustrated in Figure 1, in case the dial holding screw 30 should accidentally be loosened during removal of the cap 10, for example, there is no easy way for the operator to correctly re-assemble the parts. In other words, partial rotation of the dial might occur, and the setting thereby lost. I have also found that enameled dials are desirable in structures of this character, and it is obviously necessary to accomplish the holding of the dial without any material flexing thereof such as would result in cracking of the enamel.

With the form of my invention illustrated in Figures 4 and 5, it is possible to accomplish the desired holding of the dial and also the easy replacing of the dial in the exact position which it formerly occupied. In these figures of the drawings, parts corresponding to the parts already described are designated by the same reference characters having, however, a prime affixed thereto. The angular portion 28' of the cap 10' is provided with an opening 29' threaded to receive the reduced end 40 of a double diameter screw in which the portion 41 of the larger diameter provides an intermediate shoulder 42. From Figure 4 of the drawings it will be appreciated that adjacent the shoulder 42 there is an unthreaded portion 43 adapted to cooperate with the opening 44 in a centering washer 45. The opening 44 is of greater diameter than the diameter of the portion 43, whereby it may have a slight lateral movement relatively thereto up until such time as the entire double diameter screw is threaded tightly into the opening 29' in such manner as to clamp the washer between the angular portion 28' and the shoulder 42 at which time further lateral movement is prevented.

The collar 45 is preferably formed with one flat side 46, and the dial 33' is provided with a central opening shaped to fit over the washer and engage the same with sufficient accuracy so that the washer will hold the dial not only against rotation but, in cooperation with the peripheral flange 32', against any lateral movement. By making the opening 44 of slightly greater diameter than the diameter of the portion 43, it is possible to form the flange 32' so as to rather tightly engage the periphery of the dial, and still easily insert the dial in the event the opening 29' is slightly off-center in the cap.

The parts having been assembled in the manner described, the double diameter screw is tightened into position so as to prevent its accidental loosening, and thereafter a clamping nut 47 is threaded onto the portion 41 so as to clamp the dial in position. With this construction, in case the dial is removed, it will be apparent that it can only be replaced in one position, this position being definitely determined by the inner engagement of the flat side 46 of the washer 45 with the correspondingly shaped portion of the dial opening. This is a decided advantage in many cases, as will be readily apparent to those skilled in the art.

The dial 33' may also be formed with a depression or offset 48 in such position as to normally be covered by the nut 47 when it is in position, but uncovered upon the removal of such nut to permit the insertion of a suitable tool which removes the dial in case it sticks.

If it is desired to make any adjustment of the dial for purposes of calibration, the double diameter screw may be loosened sufficiently to permit rotation of the washer 45, and the dial thereupon turned to proper position and the parts retightened.

It will also be noted that the dial enables graduations to be placed throughout substantially its entire perimeter. This makes it possible to operate the thermostat over a greater range of temperatures, as will be readily apparent.

The casing in which the valve is provided constitutes what may be termed a support for a movable means or movable member, it being apparent to those skilled in the art that the invention is not necessarily limited to a valve, inasmuch as other devices which it is desired to control by temperature may be substituted in lieu thereof.

While I have herein illustrated and described a preferred embodiment of the present invention, it will be understood that changes in the construction and operation of the various parts may be made without departing either from the spirit of the invention or the scope of my broader claims.

I claim:

1. A temperature responsive device having a housing, an inlet and outlet chamber in the housing, a valve for controlling the flow from the inlet to the outlet chamber, thermally responsive means for moving the valve in one direction extending outwardly through the back of the housing, means for moving the valve in the other direction, a cap for closing the front of the housing, an adjusting lever means and extending from the back of the housing to the front thereof, an adjustable dial on the cap, and means for fixedly securing the dial in its adjusted position on the cap.

2. A temperature responsive device having a housing, an inlet and outlet chamber in the housing, a valve for controlling the flow from the inlet to the outlet chamber, thermally responsive means for moving the valve in one direction extending outwardly through the back of the housing, means for moving the valve in the other direction, a cap for closing the front of the housing, an adjusting lever associated with the thermally responsive means and extending from the back of the housing to the front thereof, an annular flange on said cap, an adjustable dished dial on the cap the peripheral edge of the dial being surrounded with the flange, and a screw passing through the dial into the cap for fixedly securing the dial in its adjusted position on the cap.

3. A temperature responsive device having a housing, an inlet and outlet chamber in the housing, a valve for controlling the flow from the inlet to the outlet chamber, thermally responsive means for moving the valve in one direction extending outwardly through the back of the housing, means for moving the valve in the other direction, a cap for closing the front of the housing, an adjusting lever associated with the thermally responsive means and extending from the back of the housing to the front thereof, an adjustable holder on the cap, a dial on said holder, there being inter-engaging elements on the holder and dial for preventing the dial from undesired rotation with relation to the cap, and means for securing the dial to the holder in its adjusted position.

4. In a thermostatic control valve, a valve body having a screw threaded portion, a rotatable temperature responsive tube supported by said screw threaded portion for the adjustment of said tube, and a compression spring concentrically positioned between said tube and valve body, thus preventing endwise play in said screw means and also frictionally holding said tube against accidental rotation from a desired position.

5. In a thermostatic control valve, a body portion having an end opening, a cover for said opening, a fixed temperature scale secured to the outer portion of said cover and adjustable for calibration only so as to correctly register with a movable temperature pointer carried by said valve.

6. In a thermostatic valve, a valve body having an end opening, a valve disc therein inserted through said end opening, a screw cap closure for said opening providing convenient access to said disc, a temperature dial, temperature dial positioning means fixed upon said cap and adjustable only for calibration associated with the thermally responsive tion, and means for securing said dial to said dial positioning means.

7. A thermostatic valve adapted to be fitted to the side wall of a range oven, said valve having on its end portion a radially beveled temperature scale, so inclined as to be at once readable from opposite sides or directly in front, and having temperature indicia arranged on its beveled portion so that the numerals adjacent the observer will read in proper sequence from left to right whether viewed from the left side or the right side.

8. In a temperature responsive device, a housing having an inlet and outlet chamber therein, a valve in said housing controlling the flow between said chambers, thermally responsive means for moving the valve in one direction and extending outwardly through one side of the housing, the opposite side of said housing being open to permit insertion and removal of said valve, a cap for the open end of said housing, a peripherally extending flange on said cap, a dial having tapered sides embraced within said flange, and means cooperating with the central portion of the dial for drawing the same against the cap.

In testimony whereof I have hereunto set my hand.

JOHN A. ROBERTSHAW.

CERTIFICATE OF CORRECTION.

Patent No. 1,850,727.　　　　　　　　　　　　Granted March 22, 1932, to

JOHN A. ROBERTSHAW.

It is hereby certified that error appears in the printed specification of the above numbered patent requiring correction as follows: Page 4, line 1, claim 1, before the word "means" insert the words associated with the thermally responsive; same page, line 66, claim 6, strike out the words "associated with the thermally responsive; and that the said Letters Patent should be read with these corrections therein that the same may conform to the record of the case in the Patent Office.

Signed and sealed this 3rd day of May, A. D. 1932.

M. J. Moore,
(Seal)　　　　　　　　　　　　　　　Acting Commissioner of Patents.